United States Patent [19]

Tezuka et al.

[11] 4,304,211
[45] Dec. 8, 1981

[54] CONTROL OF FUEL INJECTION TYPE INDUCTION SYSTEM

[75] Inventors: Etsuhiro Tezuka, Hamamatsu; Koichiro Kaji, Iwata; Toru Ichinose, Fukuroi, all of Japan

[73] Assignee: Yamaha Hatsukoki Kabushiki Kaisha, Iwata, Japan

[21] Appl. No.: 65,427

[22] Filed: Aug. 10, 1979

Related U.S. Application Data

[63] Continuation of Ser. No. 839,360, Oct. 4, 1977, abandoned, which is a continuation of Ser. No. 889,300, Mar. 23, 1978, abandoned.

[30] Foreign Application Priority Data

Nov. 26, 1976 [JP] Japan ............................... 51-158222
Dec. 18, 1976 [JP] Japan ............................... 51-152660
Mar. 23, 1977 [JP] Japan ............................... 52-32727

[51] Int. Cl.³ .............................................. F02B 3/00
[52] U.S. Cl. ................................... 123/585; 123/432; 123/505
[58] Field of Search ... 123/119 DB, 119 D, 139 AW, 123/124 R, 75 B, 30 C, 97 B, 33 E, 52 M

[56] References Cited

U.S. PATENT DOCUMENTS

| | | | |
|---|---|---|---|
| 2,028,585 | 1/1936 | Blake et al. | 123/119 R |
| 3,023,745 | 3/1962 | Barnes | 123/124 R |
| 3,198,498 | 8/1965 | Mennesson . | |
| 3,338,568 | 8/1967 | Mangoletsi . | |
| 3,359,958 | 12/1967 | Von Seggern et al. | 123/277 |
| 3,408,992 | 11/1968 | Von Seggern et al. | 123/277 |
| 3,664,316 | 5/1972 | Garcea | 123/124 R |
| 3,713,630 | 1/1973 | Laprade et al. . | |
| 4,064,854 | 12/1977 | Fehrenbach et al. | 123/139 AW |
| 4,084,563 | 4/1978 | Hattori et al. | 123/119 D |
| 4,129,105 | 12/1978 | Ito et al. | 123/119 D |

FOREIGN PATENT DOCUMENTS 1153559 5/1969 United Kingdom ............. 123/52 M

*Primary Examiner*—P. S. Lall
*Attorney, Agent, or Firm*—Ernest A. Beutler

[57] ABSTRACT

Controls for induction systems of fuel injection supplied internal combustion engines in which the induction system flows from an air amount detection means to combustion cylinders, through a main or principal intake passage and a sub-intake or shunt passage. Fuel injection means discharges fuel into the main intake passage in amounts determined by the detection means. The sub-intake passage directs air in a jet stream into the combustion chamber to cause turbulence therein. The sub-intake passage discharges into the combustion cylinders at a substantially different angle from the main intake passage and intersects the discharge from the fuel injection means to improve the fuel air mixture entering the combustion cylinders.

64 Claims, 7 Drawing Figures

CONTROL OF FUEL INJECTION TYPE INDUCTION SYSTEM

CROSS REFERENCE TO RELATED APPLICATION

This application is a continuation of our application of the same title, Ser. No. 839,360, filed Oct. 4, 1977 and of our application of the same title, Ser. No. 889,300, filed Mar. 23, 1978, now abandoned, which application is a continuation of application Ser. No. 839,360, now abandoned.

BACKGROUND OF THE INVENTION

This invention relates to induction systems for internal combustion engines and more particularly to induction systems for fuel injection equipped internal combustion engines.

The present invention has as its object to improve the combustion in internal combustion engines, and to obtain induction means of high practicability wherein high speed auxiliary intake air is introduced into a combustion chamber from an auxiliary induction passage of relatively small cross-section area opening into a portion of the induction means which is near to an intake valve of a combustion chamber in order to produce in the combustion chamber a high speed eddy current (sometimes called "turbulence"), thereby to increase the flame propagation speed and to stabilize the flame propagation.

In general, the concept of improving combustion in an internal combustion engine by introducing auxiliary intake air into the combustion chamber via an auxiliary induction passage is wellknown. For example, reference is made to U.S. Pat. Nos. 2,968,297 and 3,688,752. However, the construction of the induction means of U.S. Pat. No. 3,968,297 wherein an induction passage and an auxiliary induction passage are provided with a carburetor, respectively, is complicated. In the induction means of the U.S. Pat. No. 3,688,752, wherein only a main intake passage is provided with a carburetor having an auxiliary intake passage provided with no fuel supplying means, the gaseous mixture is diluted with auxiliary intake air, and as a result it is difficult to control the air fuel ratio so that the improving effect on combustion can possibly be offset.

SUMMARY OF THE INVENTION

A first feature of this invention is adapted to be embodied in an internal combustion engine having a combustion chamber, a main intake passage for delivering a charge to the combustion chamber, a sub-intake passage for delivering a charge to the chamber, and throttle valve means for controlling the proportion of the charge entering the chamber from the main and sub-intake passages. A fuel injection nozzle is provided for discharging fuel into the combustion chamber. The air flow detector is provided for controlling the amount of fuel discharged by the fuel injection nozzle in response to the amount of air flow. The air flow detector means is positioned in the induction passage at a point where all of the charge flowing through both the main and sub-intake passages passes.

Another feature of the invention is adapted to be embodied in an internal combustion engine having a variable volume chamber in which combustion occurs and a main intake passage communicating with the chamber through a main intake port for delivering a charge therethrough. In connection with this feature of the invention a sub-intake passage is provided that communicates with the chamber through a sub-intake port. The sub-intake passage has an effective cross-sectional area at the sub-intake port substantially different than the effective cross-sectional area of the main intake port for causing a given mass flow of charge through the smaller of the ports to enter the combustion chamber at a significantly greater velocity. The direction of the charge entering the chamber from the main intake port differs substantially from the direction of the charge entering the chamber from the sub-intake port. Throttle valve means control the ratio of communication of the ports with the chamber during a given cycle of operation of the engine.

A still further feature of the invention is adapted to be embodied in an internal combustion engine having a variable volume chamber in which combustion occurs. A main intake passage communicates through a main intake port with the chamber for delivering a charge to the chamber and a fuel injection nozzle discharges into the main intake passage contiguous to the main intake port. In connection with this feature of the invention a sub-intake passage terminating at a sub-intake port communicates with the main intake passage contiguous to the path of fuel discharge from the fuel injection nozzle and means causes a high velocity of air flow from the subintake passage upon an induction cycle for improving the fuel air mixing of the charge entering the chamber.

DETAILED DESCRIPTION OF THE PREFERRED EMBODIMENTS

Figure 1:
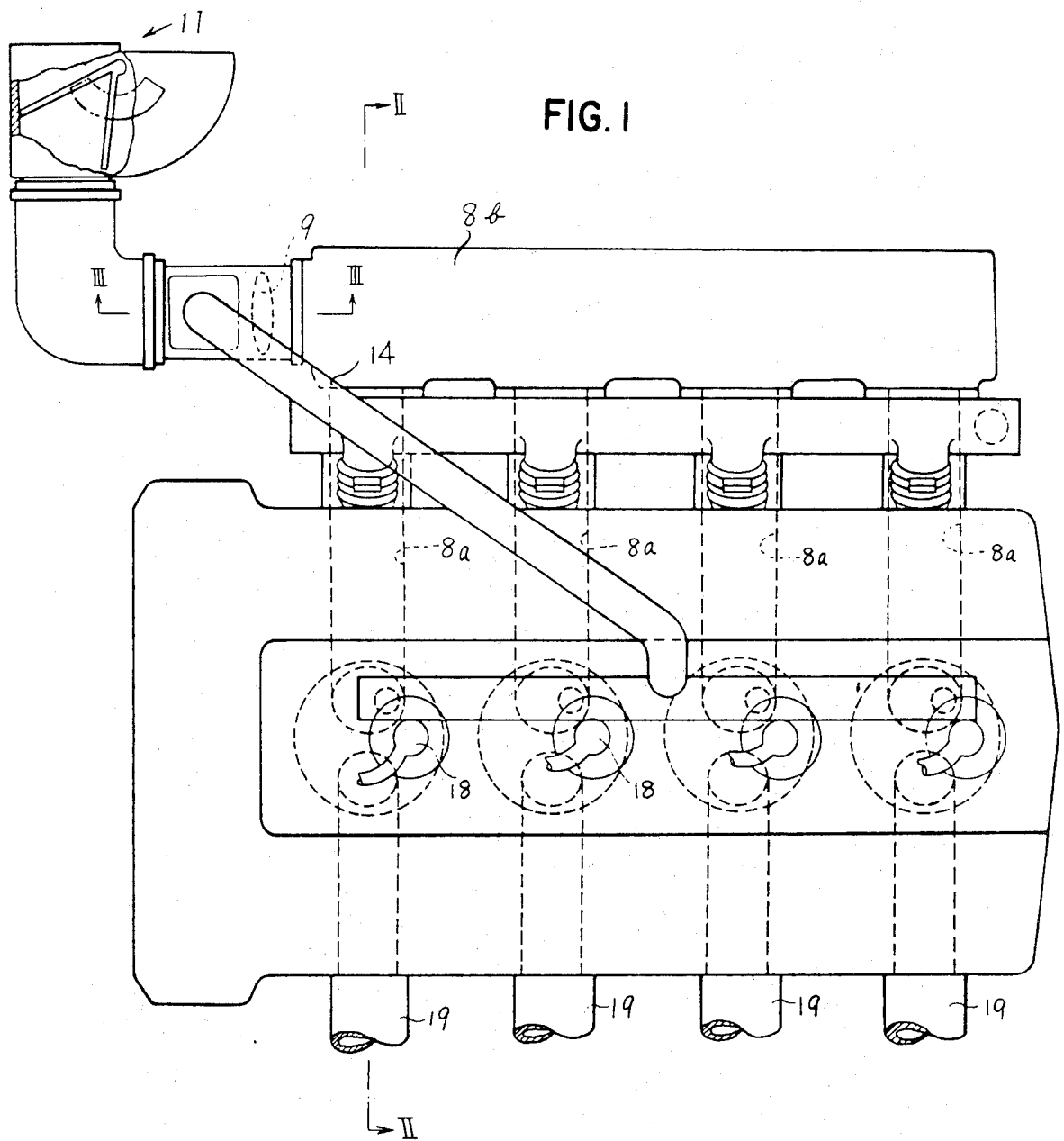
FIG. 1 is a plan view of an engine incorporating the presently preferred embodiment of the invention.

With reference to the embodiment of FIGS. 1–4, an internal combustion engine 1 includes combustion chambers 7 each formed by a cylinder head 4 with a respective intake valve 4, exhaust valve 3, cylinder bore 5 and piston 6. A main induction passage 8a communicates with each of the combustion chambers 7 through the respective intake valve 2. A principal throttle valve 9 is positioned in a plenum 8b which serves the induction passages 8. The throttle valve 9 is manually operated to control the intake of air through the main induction passages 8. Detector means 11 is provided in the induction system on the upstream side of throttle valve 9 for detecting the amount of air flow through the induction system as a whole.

As best shown in FIG. 1, detector means 11 consists of a pivoted oscillatory plate 12 which is pivotally connected near the wall of the intake of the induction system and is biased into the opening of the induction system by a torsion spring (not shown). This torsion spring is springily flexible, whereby intake air flow causes a force on the oscillatory plate 12 proportional to the amount of intake air flow, and overcomes the elastic forces of the torsion spring to rotate the plate 12 clockwise as shown in FIG. 1 out of the path of air flow in the induction system. Detailed description of the oscillatory plate will be omitted because it is well-known. The plate 12 rotates (deflects) according to the amount of intake air flow, and when the intake amount is increased, the plate 12 rotates so as to be more greatly deflected. The amount of fuel injected from a fuel injection nozzle (to be described) is under the control of the oscillatory plate 12 and increases when the amount of deflection of the oscillatory plate 12 increases, and decreases when the amount of deflection decreases in a known manner.

An auxiliary, shunt, or sub-intake induction passage 14 opens from the induction passage at a point between the plate 12 of the detector means 11 and throttle valve 9 whereby to bypass the throttle valve 9. The sub-induction passage 14 discharges into a manifold 15 which, in turn, discharges into the main induction passages 8a of the cylinder head 4 via ports 13 each of which is adjacent an intake valve 2.

The cylinder head main intake passages 8a are each charged by respective intake manifold passages 8c, each of which receives a charge of intake air from a plenum 8b. The plenum 8b is positioned downstream of the throttle valve 9 and of the detector means 11 as well as downstream of the point where the sub-intake passage 14 receives its charge of air downstream of the detector 11. It is evident then that auxiliary induction or sub-intake passage 14 forms a shunt extending from a point located between detector means 11 and throttle valve 9. The sub-intake passage 14, as has been noted, begins as a single passage which expands to the auxiliary manifold 15 and is branched by individual pipes from the auxiliary manifold 15 to rejoin the cylinder head main induction passages 8a in the vicinity of the respective intake valves 2 for the respective combustion chambers 7 at the ports 13. It will be noted that the portion of the manifold of the sub-intake system which terminates at the ports 13 is disposed at a substantial angle to the main intake passage 8a at this point. Therefore, the charge issuing from the sub-intake system will enter the combustion chamber 7 at a substantially different angle from the charge which enters from the main intake passages 8a.

Figure 3:
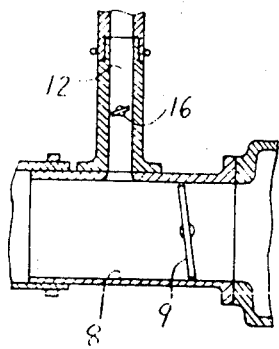
FIGS. 3 and 4 are partial cross-sectional views showing a portion of the embodiment of FIG. 1.

As shown in FIG. 3, the auxiliary induction passage 14 includes a manually operable auxiliary throttle valve 16 whose position is determined by an actuating mechanism (see the illustration represented by numeral 21 in FIG. 6) so that throttle valve 9 will be opened initially after the auxiliary throttle valve 16 begins to open and which will permit full opening of the throttle valve 9 only after the auxiliary throttle valve 16 is in its fully opened position. This actuating mechanism will be described in more detail by reference to FIG. 6 when this embodiment is described.

Figure 4:
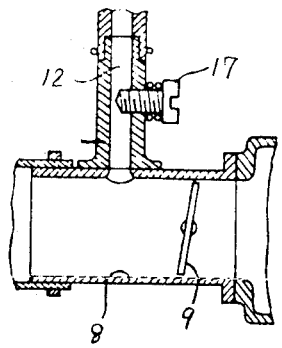
Figure 2:
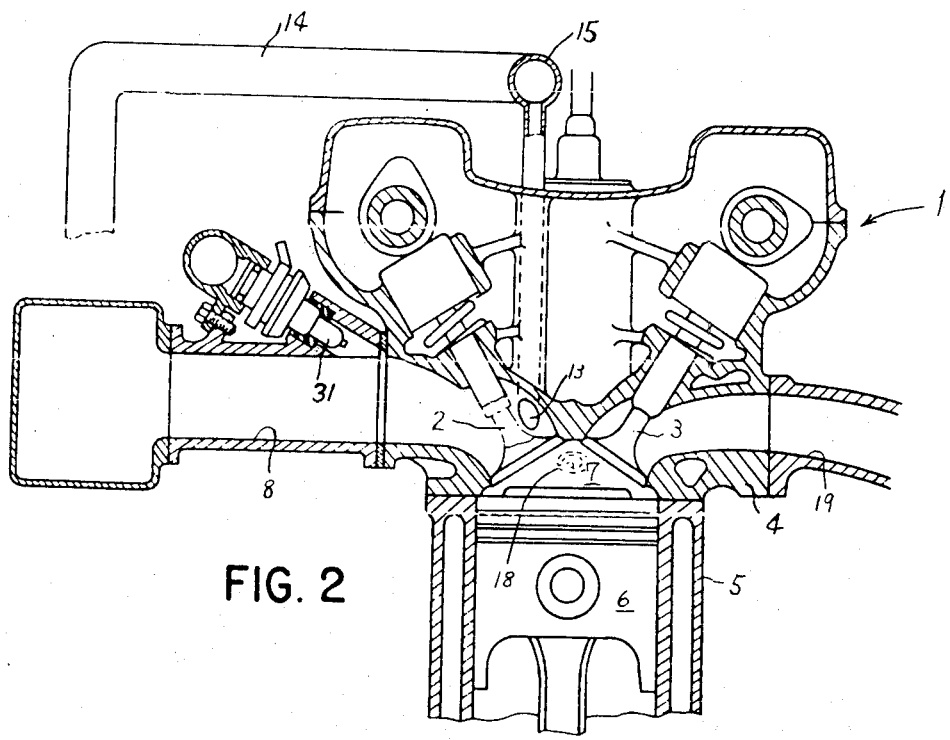
FIG. 2 is a cross-section taken at line 2—2 in FIG. 1.

FIG. 4 shows an induction means wherein an adjusting screw 17 is provided in the auxiliary induction passage 14 so that the minimum cross-section area of auxiliary intake passage 14 can be varied by turning the adjusting screw 17, the speed of idling operation being thus increased or decreased.

An ignition plug 18 is placed in the combustion chamber. Exhaust passage 19 departs from the exhaust port of the combustion chamber and the exhaust valves 3 control the flow through the exhaust passages 19.

Figure 5:
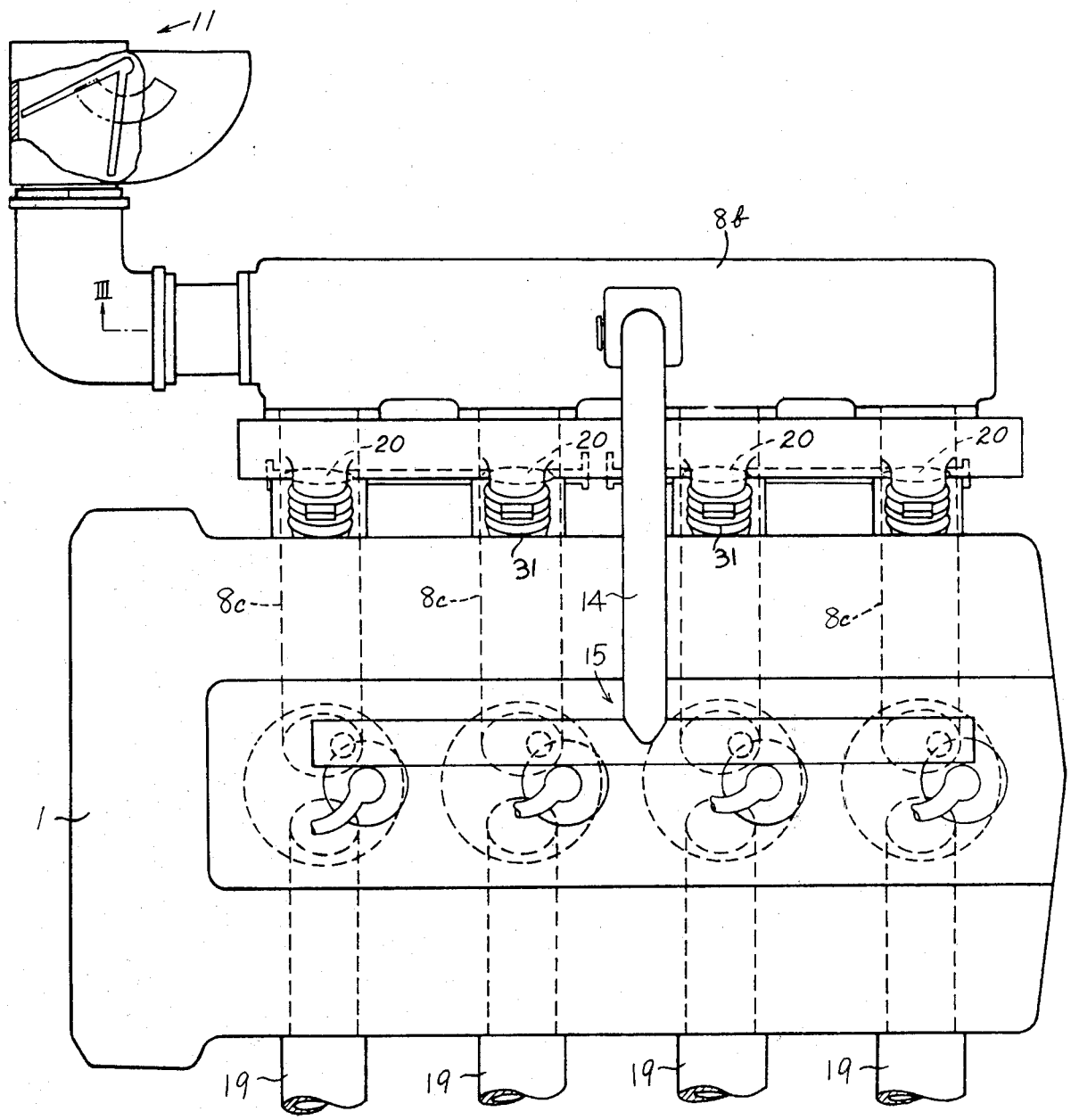
FIG. 5 is a plan view in part similar to the embodiment of FIG. 1 showing another embodiment of the invention.
Figure 6:
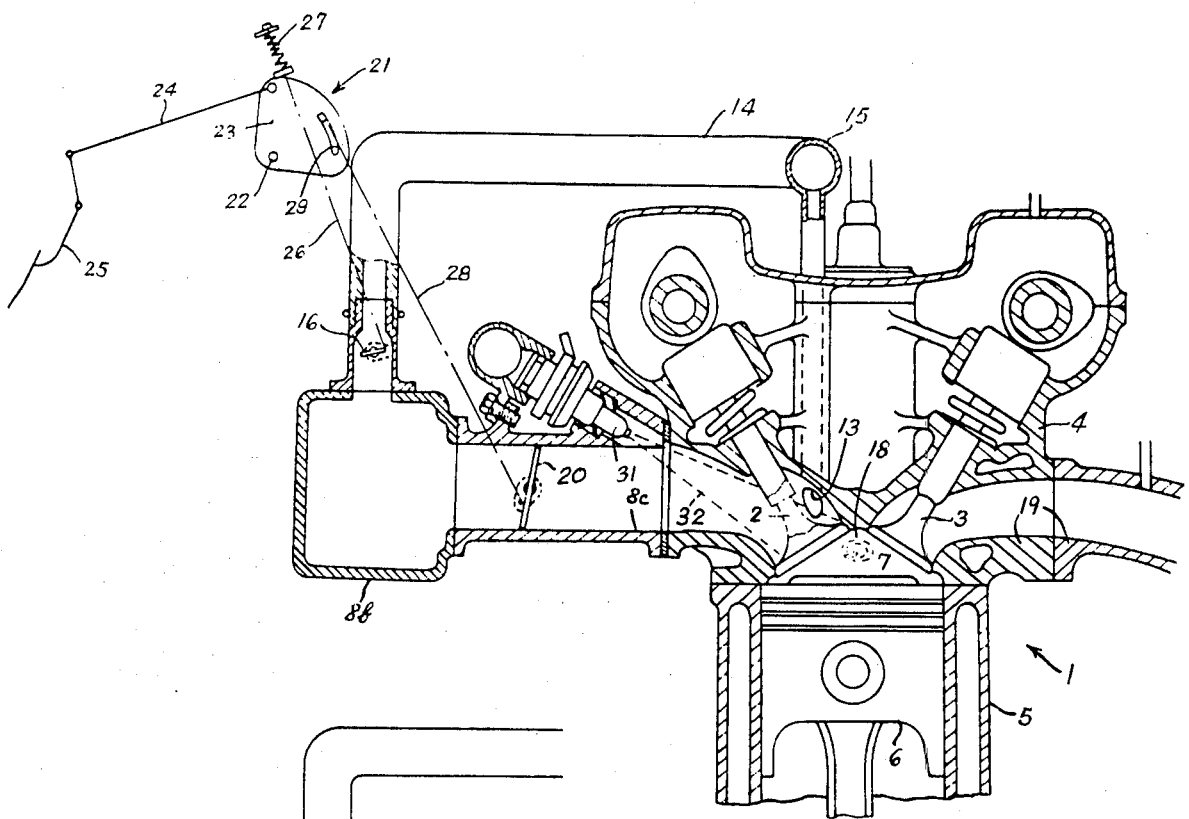
FIG. 6 is a cross-section taken along the line 6—6 of FIG. 5.

FIGS. 5 and 6 show another embodiment of the invention which is substantially similar to the embodiment of FIGS. 1-4. For this reason, identical parts which serve identical functions have been identified by the same reference numeral and the description of these parts will not be repeated. This embodiment differs from the previously described embodiment by having separate throttle valves 20 placed in each of the intake manifold induction passages 8c. This differs, therefore, from the preceding embodiment wherein one single throttle valve 9 controlled the flow through all of the main induction passages. Between the throttle valves 9 and the flow amount detector means 11, the induction passage is enlarged as a manifold to serve as an expansion or plenum chamber 8b.

In FIG. 6, an auxiliary throttle valve 16 is shown together with the previously mentioned actuating mechanism 21 which enables throttle valves 20 to be opened after the auxiliary throttle valves reach the limit of their opening movement.

A bell crank 23 of the actuating mechanism 21 is pivotally supported by shaft 22 and is connected to an accelerator pedal 25 by a wire 24. The bell crank 23 is connected to the auxiliary throttle valve 16 by a wire 26 via a spring 27. When bell crank 23 is rotated clockwise as seen in FIG. 6 of the drawing, the wire 26 is drawn via spring 27 and the throttle valve 16 is opened. As will be noted, the auxiliary throttle valve 16 reaches its fully opened position prior to full opening of the throttle valves 20. Therefore, when the accelerator pedal 25 is further opened after auxiliary throttle valve 16 has been completely opened, spring 27 is merely compressed and auxiliary throttle valve 16 does not open any farther. Bell crank 23 is connected to throttle valves 20 via a wire 28 and lost motion connection. The wire 28 is connected to the bell crank 23 via an elongated hole 29 so that, only when bell crank 23 is rotated counter-clockwise at a greater angle than a predetermined one will the throttle valves 20 be opened.

The operation of the present invention will now be further explained. When the engine is started, atmospheric pressure pushes oscillatory plate 12 of flow amount detector means 11 as a consequence of the pressure drop occurring due to the expansion of the chambers 7. Air at atmospheric pressure flows into the inlet to the induction passage 8. The greater the intake amount, the farther the oscillatory plate 12 is deflected and the fuel supply is increased. Therefore, the fuel is supplied in induction passage 8 from the fuel injection nozzle 31 according to the amount of displacement of oscillatory plate 12, whereby to produce in the combustion chamber 7 a gaseous mixture having a desired air/fuel ratio. The discharge of the injection nozzle 31 is represented by the arc 32 of FIG. 6. It will be noted that this arc intersects the head of the intake valve 2 through substantially its full circumference and that this fuel discharge is intersected by the path of air flowing through the sub-intake ports 13, for a reason to be described.

Figure 7:
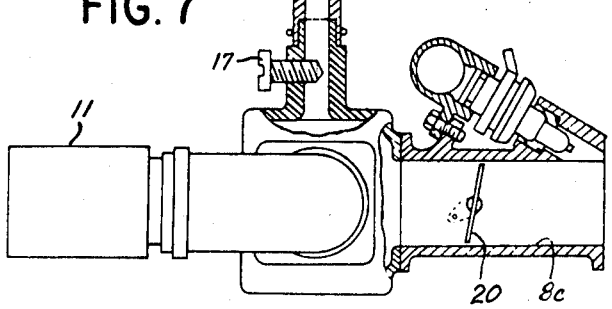
FIG. 7 is a detail of the embodiment shown in FIGS. 5 and 6.

Since the main induction system is shunted by auxiliary induction passage 14 from a point between the detector means 11 and throttle valve 9 (FIGS. 1-4) or throttle valves 20 (FIGS. 5-7) and rejoins the main induction system in the vicinity of the intake valves 2, a part of the intake air flow by-passes the main throttle valve or valves via auxiliary induction passage 14, and is injected as a fast jet from the vicinity of intake valve 2 into the cylinder head induction passage 8a and then at a high speed into the combustion chambers 7 to produce therein a high speed eddy current which persists even during the subsequent compression stroke. It will be noted that the angle the charge enters the combustion chamber 7 from the sub-intake port 13 will differ substantially from the angle the charge enters the combustion chamber 7 from the main intake passages 8a. Furthermore, the intersection of the high velocity air flowing through the sub-intake port 13 with the discharge of the fuel injection nozzle 31 will aid in mixture distribution and vaporization. Then the electric spark occurring at the ignition plug 18 fires the gaseous mixture near the electrode of the ignition plug to create a flame front. This flame front flows on the high speed eddy currents and is propagated at a high speed in the combustion chamber. As a result, flame propagation can be effected in a stable condition.

In addition to improving combustion as a result of the sub-intake passages 14, the provision of these passages and the use of them to supply substantially all of the idle and low-speed air requirements of the engine improves the velocity of the charge entering the chamber 7 under these conditions and still further improves the engine performance.

Since the fuel supplied from fuel injection nozzle 31 is detected by detector means 11 on the upstream side of where the auxiliary induction passage 14 is shunted, the entire intake amount can be detected irrespective of the change in ratio of the air flowing through the auxiliary induction passage 14 and through the main induction system. Thus an accurate air/fuel ratio can be maintained, and a construction where detector means 11 or fuel injection nozzle is provided in the auxiliary induction passage as well need not be employed. Therefore, the construction of the present invention is simple, and it allows for a simple measurement of fuel.

By having the fuel injection nozzle 31 discharge in the main induction system downstream of the place where the charge is introduced into the sub-intake system, no fuel flows through the sub-intake system. Therefore, the likelihood of condensation of fuel in the sub-intake passages at very low temperatures will be avoided, thus avoiding uneven running due to variations in fuel air mixture.

The auxiliary throttle 16 is provided in the auxiliary induction passage 14 in order to reduce the tendency to rapidly decrease air flow amount in the auxiliary induction passage when throttle valve 9 (FIGS. 1-4) or valves 20 (FIGS. 5-7) is at an amount of opening a little greater than the idling opening. This produces a strong eddy current (turbulence) in combustion chambers 7 through auxiliary induction passage 14 even under running conditions where the main throttle valve or valves are opened to a comparatively large degree.

According to the present invention as described above, the induction passage is shunted from a point located between the intake amount detector means and the main throttle valve or valves to form an auxiliary induction passage which opens near the intake valve and is directed toward the combustion chamber. Therefore, it is sufficient to provide only one air metering means and only one fuel injection nozzle for supplying fuel to each combustion chamber 7. The injection nozzle may supply fuel in either the main intake passage or in the auxiliary intake passage. The term "induction passage" or "main induction passage" includes the passage portion downstream from where the auxiliary induction passage ("shunt passage") re-enters to principal induction passage.

The present invention is simple in construction and the measurement of fuel can easily be attained. Since the amount of fuel supplied from a fuel injection nozzle is measured by reference to the entire intake amount of air detected by the detector means, the changes if any in the ratio of the amount of intake air flowing through main induction system so that of air flowing through auxiliary induction passage 14 does not cause any change in the air fuel ratio. Therefore, the present invention enables one to maintain an accurate air fuel ratio in a system of this type.

This invention is not to be limited by the embodiments shown in the drawings and described in the description which are given by way of example and not of limitation, but only in accordance with the scope of the appended claims.

We claim:

1. In combination with an internal combustion engine of the type which includes a chamber of variable volume in which combustion occurs and a main induction passage receiving air to form a charge for the chamber and to deliver said charge to said chamber through a main intake port, an air amount detection means to measure the air flow into said main induction passage, fuel supply means supplying fuel to said chamber in amounts determined by said air amount detection means, main throttle valve means for controlling the flow through at least a portion of said main induction passage, the improvement comprising an auxiliary induction passage extending from a point in said main induction passage between said air amount detection means and said main throttle valve means and discharging into said chamber through an auxiliary intake port communicating with said main induction passage contiguous to said main intake port for delivering a turbulent charge to said chamber, said auxiliary intake port being juxtaposed to said chamber for delivering the charge to the chamber at substantially undiminished velocity, said auxiliary induction passage being sized to provide substantially all of the air flow requirements of said chamber at least at the idle condition of the engine, the fuel supplied by said fuel supply means being proportional to the total air supplied regardless of the ratio of charge supplied to said chamber by said passages.

2. Apparatus according to claim 1 wherein there are a plurality of chambers and a main intake port and auxiliary intake port delivers a charge to each of said chambers.

3. Apparatus according to claim 2 wherein the throttle valve means comprises a single main throttle valve upstream from all of the chambers in a common portion of the main induction passages for controlling air flow to all chambers.

4. An internal combustion engine as set forth in claim 3 wherein an intake valve cooperates with the main intake port for controlling the communication of the main induction passage with the chamber.

5. Apparatus according to claim 2 wherein the throttle valve means comprises a plurality of main throttle valves, there being one main throttle valve for each of said chambers.

6. An internal combustion engine as set forth in claim 5 wherein an intake valve cooperates with the main intake port for controlling the communication of the main induction passage with the chamber.

7. Apparatus according to claim 2 in which the induction passages are common adjacent to the air amount detection means, and branch from a manifold to the respective chambers.

8. Apparatus according to claim 7 in which the main throttle valve means comprises a single main throttle valve upstream from the manifold.

9. Apparatus according to claim 8 in which an auxiliary throttle valve is disposed in the auxiliary induction passage to control the rate of air flow therethrough.

10. Apparatus according to claim 7 in which the main throttle valve means comprises a separate throttle valve provided for each chamber, downstream from the manifold.

11. An apparatus according to claim 5 or 10 wherein the main throttle valves are disposed co-axially with each other, the least certain of said main throttle valves being affixed to the same shaft.

12. Apparatus according to claim 10 in which an auxiliary throttle valve is disposed in the auxiliary induction passage to control the rate of air flow therethrough.

13. An internal combustion engine as set forth in claim 2 wherein an intake valve cooperates with the main intake port for controlling the communication of the main induction passage with the chamber.

14. Apparatus according to claim 1 in which said auxiliary intake passage includes an orifice for determining the maximum air flow therethrough and accordingly the idle speed of the engine.

15. Apparatus according to claim 14 in which said orifice is adjustable.

16. Apparatus according to claim 1 further including an auxiliary throttle valve disposed in the auxiliary induction passage to control the rate of air flow therethrough.

17. Apparatus according to claim 16 in which means is provided for opening the throttle valve means, said means causing the auxiliary throttle valve to open sequentially with and in advance to opening of the main throttle valve.

18. Apparatus according to claim 1 in which the fuel supply means comprises a fuel injection nozzle downstream from the main throttle valve.

19. Apparatus according to claim 18 in which an auxiliary throttle valve is disposed in the auxiliary induction passage to control the rate of air flow therethrough.

20. An internal combustion engine as set forth in claim 1 wherein an intake valve cooperates with the main intake port for controlling the communication of the main induction passage with the chamber.

21. An internal combustion engine having a variable volume chamber in which combustion occurs and a main intake passage communicating with said chamber through a main intake port for delivering a charge thereto, the improvement comprising a sub-intake passage communicating with said chamber through a sub-intake port, said sub-intake port being in communication with said main intake passage contiguous to said main intake port for delivery of the charge to said chamber from said sub-intake port in substantially undiminished velocity and direction, said sub-intake passage having an effective cross-sectional area substantially less than the effective cross-sectional area of said main intake passage for causing a given mass flow of charge through said sub-intake port to enter the chamber at a substantially greater velocity, the direction of the charge entering said chamber from said main intake port differing substantially from the direction of the charge entering said chamber from said sub-intake port, throttle valve means comprising throttle valve means positioned in said sub-intake passage and throttle means in said main intake passage for controlling the ratio of communication of said ports with said chamber during a given cycle of operation of said engine and actuating means for opening said throttle valves, said actuating means being operative to effect initial opening of the throttle valve in said sub-intake passage prior to opening of the throttle valve in said main intake passage so that the flow pattern inducted by said sub-intake passage predominates the flow pattern in said chamber before the throttle valve in said main intake passage is opened.

22. An internal combustion engine as set forth in claim 21 wherein the engine has a plurality of chambers as defined with main intake passages and sub-intake passages for each of said chambers.

23. An internal combustion engine as set forth in claim 22 wherein the main intake passages are all served by a common intake.

24. An internal combustion engine as set forth in claim 22 wherein the sub-intake passages are all served by a common intake.

25. An internal combustion engine as set forth in claim 24 wherein the main intake passages all are served by a common intake.

26. An internal combustion engine as set forth in claim 25 wherein the intake for all of the main and sub-intake passages is common.

27. An internal combustion engine as set forth in claim 26 further including a plurality of fuel injection nozzles, there being one fuel injection nozzle for each of said main induction passages for delivering fuel to said main induction passages, means for controlling the amount of fuel supplied to each of said fuel injection nozzles in response to the amount of air flow through the common intake for said induction passages.

28. An internal combustion engine as set forth in claim 23 wherein the main throttle valve means comprises a single main throttle valve in the common intake of the main intake passages.

29. An internal combustion engine as set forth in claim 28 wherein an intake valve cooperates with the main intake port for controlling the communication of the main induction passage with the chamber.

30. An internal combustion engine as set forth in claim 23 wherein the main throttle valve means comprises a plurality of main throttle valves, there being one such main throttle valve positioned in each of the main intake passages.

31. An internal combustion engine as set forth in claim 30 wherein an intake valve cooperates with the main intake port for controlling the communication of the main induction passage with the chamber.

32. An internal combustion engine as set forth in claims 30 wherein the main throttle valves are disposed coaxially with each other, the least certain of said main throttle valves being affixed to the same shaft.

33. An internal combustion engine as set forth in claim 23 further including a plurality of fuel injectors for injecting fuel into each of the main intake passages.

34. An internal combustion engine as set forth in claim 33 wherein the amount of fuel delivered to each of said fuel injectors is controlled by a detector responsive to the air flow through the common intake for the main intake passages.

35. In an internal combustion engine having a variable volume chamber in which combustion occurs and a main intake passage communicating with said chamber through a main intake port for delivering a charge thereto, the improvement comprising a sub-intake passage communicating with said chamber through a sub-intake port, said sub-intake port being in communication with said main intake passage contiguous with said main intake port for delivery of the charge to said chamber from said sub-intake port in substantially undiminished velocity and direction, said sub-intake passage having an effective cross-sectional area substantially less than the effective cross-sectional area of said main intake passage for causing a given mass flow of charge through said sub-intake port to enter the chamber at a substantially greater velocity, said sub-intake port being sufficiently large so as to provide sufficient flow to satisfy substantially all of the engine idle charge requirements, the direction of the charge entering said chamber from said main intake port differing substantially from the direction of the charge entering said chamber from said sub-intake port, and throttle valve means for controlling the ratio of communication of said ports with said chamber during a given cycle of operation of said engine and for directing substantially all of the idle charge requirements to said chamber through said sub-intake port and so that the flow pattern generated by said sub-intake port predominates the flow pattern in said chamber during idle operation.

36. An internal combustion engine as set forth in claim 35 wherein the throttle valve means comprises a throttle valve positioned in at least one of said passages.

37. An internal combustion engine as set forth in claim 36 wherein the throttle valve is positioned in the main intake passage.

38. An internal combustion engine as set forth in claim 36 wherein the throttle valve is positioned in the sub-intake passage.

39. An internal combustion engine as set forth in claim 38 wherein the throttle valve means further includes a throttle valve in the main intake passage.

40. An internal combustion engine as set forth in claim 35 further including adjustable orifice means for providing a fixed adjustment in the cross-sectional area of the smaller of the induction passages for controlling the idle speed.

41. An internal combustion engine as set forth in claim 35 wherein an intake valve cooperates with the main intake port for controlling the communication of the main induction passage with the chamber.

42. In an internal combustion engine having a variable volume chamber in which combustion occurs, a main intake passage communicating through a main intake port with said chamber for delivering a charge to said chamber and a fuel injection nozzle discharging in to said main induction passage contiguous to said main intake port, the improvement comprising a sub-intake passage terminating at a sub-intake port communicating with said main intake passage contiguous to the path of fuel discharge from said fuel injection nozzle, and means for causing a high velocity of air flow from said sub-intake passage across the path of fuel discharge upon an induction cycle.

43. An internal combustion engine as set forth in claim 42 wherein the means for causing a high velocity of air flow from the sub-intake passage comprises throttle valve means for controlling the ratio of communication of said ports with said chamber during a given cycle of operation of the engine.

44. An internal combustion engine as set forth in claim 43 wherein the throttle valve means comprises a throttle valve in the main induction passage.

45. An internal combustion engine as set forth in claim 44 wherein the throttle valve means further includes a throttle valve in the sub-induction passage.

46. An internal combustion engine as set forth in claim 45 further including actuating means for opening the throttle valve of the sub-induction system passage prior to opening of the throttle valve of the main induction passage.

47. An internal combustion engine as set forth in claim 42 further including air flow detector means for controlling the amount of fuel discharged by said fuel injection nozzle.

48. An internal combustion engine as set forth in claim 47 wherein the main intake passage and the sub-intake passage are served by a common air intake, the means for controlling the fuel flow comprising an element positioned in said common air intake.

49. An internal combustion engine as set forth in claim 42 wherein the sub-intake port discharges into the main induction passage at a substantially different angle from the direction of flow through said main induction passage.

50. In an induction system for a multiple chamber engine having a plurality of substantially open variable volume chambers in which combustion occurs, a plurality of main induction passages, each communicating with a respective open variable volume chamber through a respective main intake port, and a plurality of auxiliary induction passages, each communicating with a respective of said variable volume chambers, through respective auxiliary intake ports, said auxiliary intake ports being in communication with said main induction passages contiguous to the respective main intake port for delivery of the charge therefrom to the respective chamber at substantially unrestricted velocity and unchanged direction, said auxiliary induction passages having a substantially lesser effective cross-sectional area than said main induction passages so that a given mass flow through said auxiliary induction passages enters the respective chambers at a substantially greater velocity than the same mass flow through said main induction passages, the improvement comprising means providing substantially unrestricted communication of said auxiliary induction passages with each other at least during the low speed running of the engine.

51. An internal combustion engine having a substantially open variable volume chamber in which combustion occurs, a main intake passage communicating with said chamber for delivering a charge thereto, an auxiliary intake passage communicating with said chamber, said auxiliary intake passage having an effective cross-sectional area substantially less than the effective cross-sectional area of said main intake passage for causing a given mass flow of charge through said auxiliary intake passage to enter the chamber at a substantially greater velocity, said auxiliary intake passage having an outlet disposed relative to said chamber so that the charge enters the open portion of said chamber from said auxiliary intake passage outlet at substantially undiminished velocity and in a substantially different direction than the flow from said main intake passage, said auxiliary intake passage having its inlet communicating directly with said main intake passage and its outlet communicating with said main intake passage contiguous to its point of discharge into said chamber, and throttle valve means for controlling the ratio of communication of said ports with said chamber during a given cycle of operation of said engine, said throttle valve means comprising a throttle valve in said main intake passage between said chamber and said auxiliary intake passage inlet.

52. Apparatus according to claim 51 wherein the throttle valve is maintained in a substantially closed position at low loads for diverting the charge flowing through the main intake passage into the auxiliary intake passage inlet.

53. Apparatus according to claim 52 wherein the throttle valve means further includes a second throttle valve.

54. Apparatus according to claim 53 wherein the second throttle valve is operated manually and the first mentioned throttle valve is operated in response to the positioning of the second throttle valve.

55. Apparatus according to claim 54 wherein linkage means interconnects the second and first throttle valves, said linkage means being effective to permit a predetermined degree of opening of said second throttle valve without opening movement of said first throttle valve and, thereafter, opening of said first throttle valve.

56. Apparatus according to claims 51, 52, 54 or 55 wherein the main intake passage communicates with the chamber through a main intake port.

57. Apparatus according to claim 56, further including an intake valve cooperating with the main intake port for controlling the communication between the intake passages and the chamber.

58. In an induction system for a multiple cylinder engine having a plurality of variable volume chambers in which combustion occurs, a plurality of main induction passages, each communicating with a respective variable volume chamber, a plurality of auxiliary induction passages, each communicating with a respective of said variable volume chambers, said auxiliary induction passages having a substantially lesser effective cross-sectional area than the main induction passages so that a given mass flow through said auxiliary induction passages enters the respective chambers at a substantially greater velocity than the same mass flow through said main induction passages, said auxiliary induction passages each communicating respective of said main induction passage contiguous to a point of communication with the respective chamber for discharge of the charge therefrom into said chambers at substantially undiminished velocity, main throttle valve means for controlling the flow through said main induction passages to the respective chambers, and auxiliary throttle valve means controlling the flow through said auxiliary induction passages to the respective chambers, the improvement comprising said auxiliary induction passages each communicating with said primary induction passages downstream from said main throttle valve means and passage means providing substantially unrestricted communication of said auxiliary induction passages with each other for maintaining the pressure in said main induction passage downstream of said main throttle valve means at a pressure less than atmospheric.

59. An induction system as set forth in claim 58, wherein the main throttle valve means comprises a separate throttle valve in each main induction passage.

60. An induction system as set forth in claim 59 wherein the main throttle valves are disposed co-axially with each other, the least certain of said main throttle valves being affixed to the same shaft.

61. An induction system as set forth in claim 58, wherein the auxiliary throttle valve means comprises a separate throttle valve in each auxiliary induction passage.

62. An induction system as set forth in claim 58 wherein the balance passage means communicates the auxiliary induction passages with each other downstream of the main throttle valve means.

63. An induction system as set forth in claim 58 wherein the passage means communicates the auxiliary induction passages with each other downstream of the auxiliary throttle valve means.

64. An induction system as set forth in claim 63, wherein the passage means communicates the auxiliary induction passages with each other downstream of the main throttle valve means.

* * * * *

UNITED STATES PATENT AND TRADEMARK OFFICE
CERTIFICATE OF CORRECTION

PATENT NO. : 4,304,211

DATED : December 8, 1981

INVENTOR(S) : Etsuhiro Tezuka, et al

It is certified that error appears in the above—identified patent and that said Letters Patent is hereby corrected as shown below:

Column 1, line 37, "3,968,297" should be ---2,968,297---; Column 2, line 29, "subintake" should be ---sub-intake---; Column 2, line 52, "4" should be ---2---; Column 7, line 1, after "the" insert ---main---.

Signed and Sealed this

Fifth Day of October 1982

[SEAL]

Attest:

GERALD J. MOSSINGHOFF

Attesting Officer     Commissioner of Patents and Trademarks